US008117551B2

(12) United States Patent
Cheng et al.

(10) Patent No.: US 8,117,551 B2
(45) Date of Patent: Feb. 14, 2012

(54) COMPUTER SYSTEM AND METHOD OF USING PRESENCE VISUALIZATIONS OF AVATARS AS PERSISTABLE VIRTUAL CONTACT OBJECTS

(75) Inventors: Li-Te Cheng, Malden, MA (US); Steven L. Rohall, Winchester, MA (US); John F. Patterson, Carlisle, MA (US); Masato Ikura, Holmdel, NJ (US); Phuong B. Le, Bloomington, IL (US)

(73) Assignee: International Business Machines Corporation, Armonk, NY (US)

( * ) Notice: Subject to any disclaimer, the term of this patent is extended or adjusted under 35 U.S.C. 154(b) by 748 days.

(21) Appl. No.: 11/959,119

(22) Filed: Dec. 18, 2007

(65) Prior Publication Data

US 2009/0158151 A1    Jun. 18, 2009

(51) Int. Cl.
*G06F 3/048* (2006.01)
(52) U.S. Cl. ......... 715/757; 715/706; 715/764; 715/848
(58) Field of Classification Search .................. 715/757, 715/706, 848, 764, 851, 852, 759, 758
See application file for complete search history.

(56) References Cited

U.S. PATENT DOCUMENTS

| | | | | |
|---|---|---|---|---|
| 6,054,991 A * | 4/2000 | Crane et al. | .................... | 345/420 |
| 6,609,147 B1 * | 8/2003 | Matsuda et al. | ............. | 709/205 |
| 6,784,901 B1 * | 8/2004 | Harvey et al. | ................. | 715/757 |
| 7,484,175 B2 * | 1/2009 | Kirkland | ........................ | 715/751 |
| 7,503,006 B2 * | 3/2009 | Danieli | .......................... | 715/751 |
| 7,669,134 B1 * | 2/2010 | Christie et al. | ................. | 715/758 |
| 2002/0098890 A1 * | 7/2002 | Sakaguchi | ....................... | 463/42 |
| 2008/0263460 A1 * | 10/2008 | Altberg et al. | ................. | 715/757 |
| 2009/0064052 A1 * | 3/2009 | Mihalcheon | ................... | 715/850 |

OTHER PUBLICATIONS

IBM Technical Disclosure Bulletin, "Tagging Objects to Form an Arbitrary Group," May 1, 1997, vol. 40, Issue 5, p. 115-116.*
Drew, H., http://web.media.mit.edu/~dharry/infospaces/full_description.html. Sociable Media Group, MIT Media Lab.

* cited by examiner

*Primary Examiner* — Kieu Vu
*Assistant Examiner* — Blaine T. Basom
(74) *Attorney, Agent, or Firm* — Hamilton, Brook, Smith & Reynolds, P.C.

(57) ABSTRACT

Computer method and apparatus represent users by respective avatars in a subject virtual environment. The invention system displays the avatars in the virtual environment, and for each avatar, displays in proximity to the avatar, a respective trail of virtual contact objects. The respective trail of virtual contact objects is associated with the user represented by the avatar and serves as a visual indication of presence and activeness (level of activity) of the user in the subject virtual environment. Each virtual contact object in the respective trail stores and provides user contact data of the user and is persistable upon end-user command.

21 Claims, 6 Drawing Sheets

COMPUTER SYSTEM AND METHOD OF USING PRESENCE VISUALIZATIONS OF AVATARS AS PERSISTABLE VIRTUAL CONTACT OBJECTS

BACKGROUND OF THE INVENTION

A popular aspect of virtual worlds such as Second Life, There.com, and World of Warcraft is socializing. Such socializing involves meeting up with new contacts and keeping track of them. But a challenge is finding these contacts if they are in a virtual world at the same time as you, getting more information about these contacts, and initiating in-world actions with these contacts. Current solutions to these challenges can be classified as follows:

IM Style Buddy Lists: Probably the most prevalent approach is borrowed from IM (Instant Messaging) clients such as AIM (AOL Instant Messaging) and Lotus Sametime, which use a 2-D list of names with additional metadata. The metadata includes whether the contact is in-world or not, in-world location details, a phone number to call, and a photo. The list may have actionable buttons or context menus to perform actions such as initiate a chat, invite to a group, or invite the recipient to teleport to your location. This is featured in many games and virtual worlds like Second Life, World of Warcraft, IMVU, etc. The strength of this approach is the re-use of a familiar user-interface metaphor from IM systems. The main drawback of this approach is that it distracts the user from the immerse 3-D environment: the list is presented as a fullscreen display, a floating dialog window, or a sidebar window, and the list does not leverage the innate properties of the actual virtual environment.

Virtual Contact Objects: A less common approach is to create an in-world object that provides the same data as one or more contacts in an IM-style buddy list, and the object can be manipulated by an avatar to perform actions such as initiate a chat, invite to a group, or teleport people to other people's locations. The strength of this approach is the representation of contacts as actual manipulable virtual objects. The main drawback of this approach is that the owner of the object needs to remember to instantiate the object and give it to a recipient, much like the process of giving a business card in the real world. Another problem is the recipient of the object must remember to find the object and bring it up to make use of the metadata (such as to find out whether the contact is present in-world or not).

Online Presence Visualization: Some of the metadata of contacts can be displayed as in-world or heads-up-display visualizations portraying the presence of contacts in the virtual world. For example, in many first-person shooter games (as well as virtual worlds like Second Life), a top-down map or radar overlay presented in the user interface can show where contacts are within range of the user as dots. The dots can be annotated with names and other data. Another example is the use of footprints or trails in the sky (see Drew Harry's Information Spaces work at web.media.mit.edu/~dharry/infospaces/full_description.html)—where potential contacts leave behind a visible floating trail in the sky. The strength of this approach is the ability for visualization to provide a quick visual summary of activity in the virtual world. The main drawback of this approach is that there is a limit of how much metadata can be portrayed in a visualization, and if the contact is offline, then there is nothing to visualize and hence the user cannot retrieve the metadata.

SUMMARY OF THE INVENTION

Applicants contend that the present invention addresses the foregoing challenges of finding contacts and representing their metadata in-world, and leverages the advantages of the virtual contact objects and online visualization approaches in particular.

The present invention merges the ideas behind the online visualization and virtual contact objects approaches mentioned above. Specifically, the invention applies an in-world visualization of "presence" (user activeness) in the virtual world by creating a floating trail of objects, but any object in the trail can be persisted as a virtual contact object that can be taken, copied, and shared. The persisted contact object is actionable by the user (e.g. via a context menu) to perform actions such as teleport the user to the present location of the contact. The appearance of individual objects in the trail and persisted objects can vary depending on user actions, providing a visual cue for others (e.g. objects in the trail can fade over time to give a sense of age, and objects could include icons representing what actions the avatar performed in the environment).

The advantages of this invention are as follows:

In-World Representation: Unlike the IM Style Buddy Lists approach, no separate 2-D UI (user interface) is used. This approach is fully integrated in the 3-D user experience. By varying the appearance of the virtual objects, whether they are in the trail or persisted the invention approach provides visual cues for others in the virtual environment.

Contact Objects are Always Present if the Contact is Around: Unlike the virtual contact object approach of prior art, the user need not consciously give away contact objects to others in the present invention. The in-world visualization of the present invention is essentially generating an infinite stream of objects that anybody (any user) can take.

Persisted, Carryable, Manipulable even when the Contact is Offline: Like the prior art virtual contact object, the present invention objects persisted from the floating trail can be used when the corresponding contact (user) is offline and no visualization is available.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

The present invention can be implemented as an extension on many scriptable virtual world and gaming engine systems. Here is an example (non-limiting) of one implementation approach. The following is for purposes of illustration and not limitation.

Example Pseudo Code

1. At a regular time interval, create a new temporary virtual contact object over the head of each avatar of interest in the virtual world.

2. For each new temporary virtual contact object:

A. (i) using the system's physics engine, define the contact object as lighter than air and apply a vertical impulse upwards or (ii) using a timer thread, change the contact object's vertical position in space to a higher position, or otherwise position the virtual contact objects in a time-ordered series along a vertically displayed path.

B. If a user performs a predefined (certain) action on the virtual contact object (e.g. clicking on or otherwise selecting the object), turn the object into a persisted contact object.

C. Alter the appearance of the virtual object depending on criteria such as time, height, display in screen view, user action, contact metadata, etc.

D. After a predefined time interval or a predefined height achieved by the virtual object, delete the contact virtual object if nobody has persisted it.

3. For each persisted contact object:

A. provide additional capabilities for user manipulation via user input or visualization, e.g. provide context menus to teleport the user to the contact, change the color based on online status, etc.

B. provide the option of altering the appearance of the persisted contact object depending on criteria such as time, height, user action, contact metadata, etc., and C. maintain the contact object as a permanent object in the virtual world e.g. keep this as an object in the user's inventory, associate the object with the room it is located in, etc.

The foregoing can be accomplished using common techniques and data structures for example state machines, tables, rules, counters/timers and so forth.

FIGS. 1-4 are screenshots showing a possible implementation of the present invention.

Figure 1:
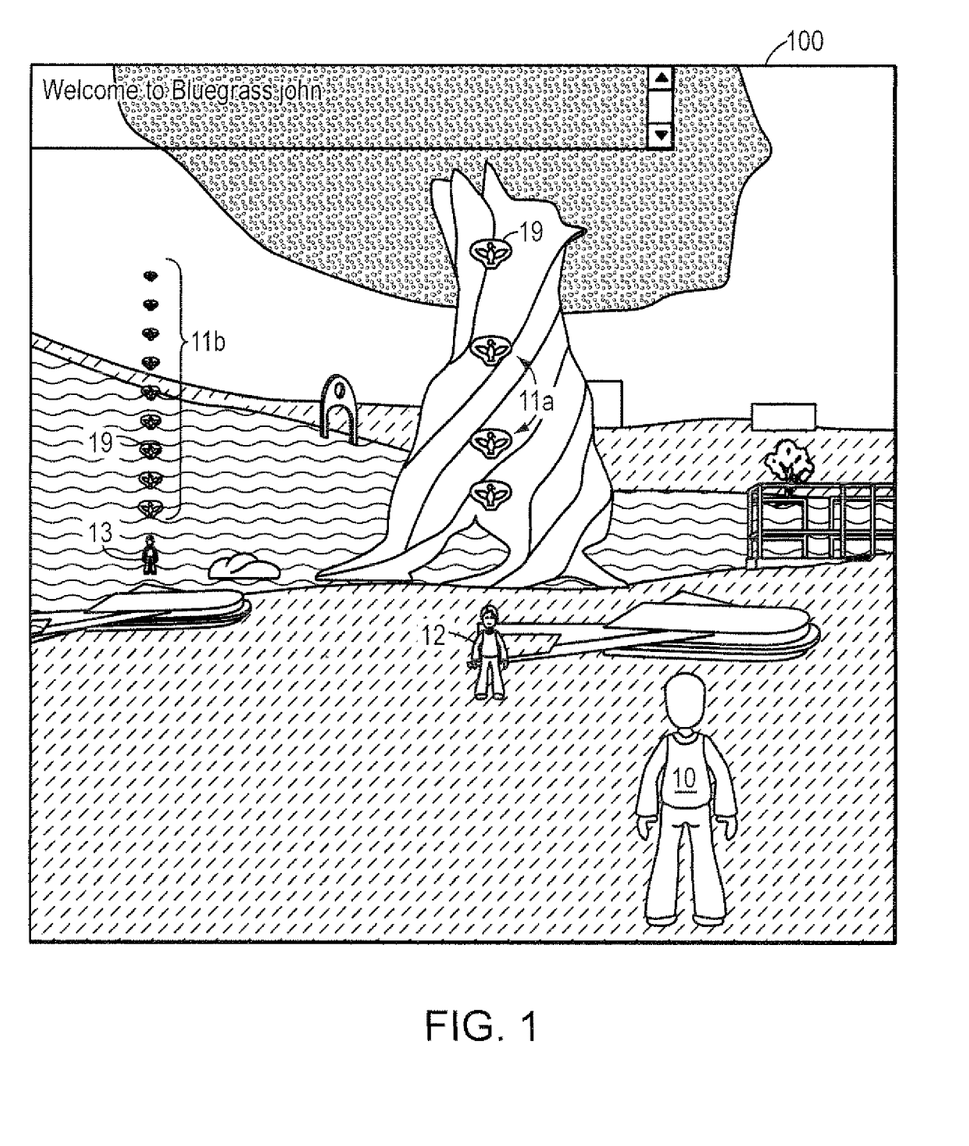
FIG. 1 is a schematic illustration of a virtual environment ("world") employing an embodiment of the present invention.

In FIG. 1 a virtual environment is shown. The particular displayed area or neighborhood of the virtual world is labeled 'Blue Grass'. The end user engaging in the subject virtual world is graphically illustrated as character 10 (generally referred to as avatar). The view of the virtual world as seen by character 10 is the perspective illustrated and displayed to the end user through computer screen view 100.

Illustrated are several avatars 12, 13 in the distance with their locations highlighted by respective trails 11a, b of floating virtual contact objects (represented as different colored fireflies here but may have other designs in other embodiments). Each trail 11 is displayed in proximity of the respective avatar 12, 13. For a given avatar 12, his trail 11a is formed by a series or sequence of virtual contact objects 19. Each virtual contact object 19 is (or is capable of being) indicative of or representative of the user-contact corresponding to the respective avatar 12 associated with the trail 11. This (the respective trails 11 per avatar 12, 13) provides visualization of contact presence in the virtual world.

Figure 2:
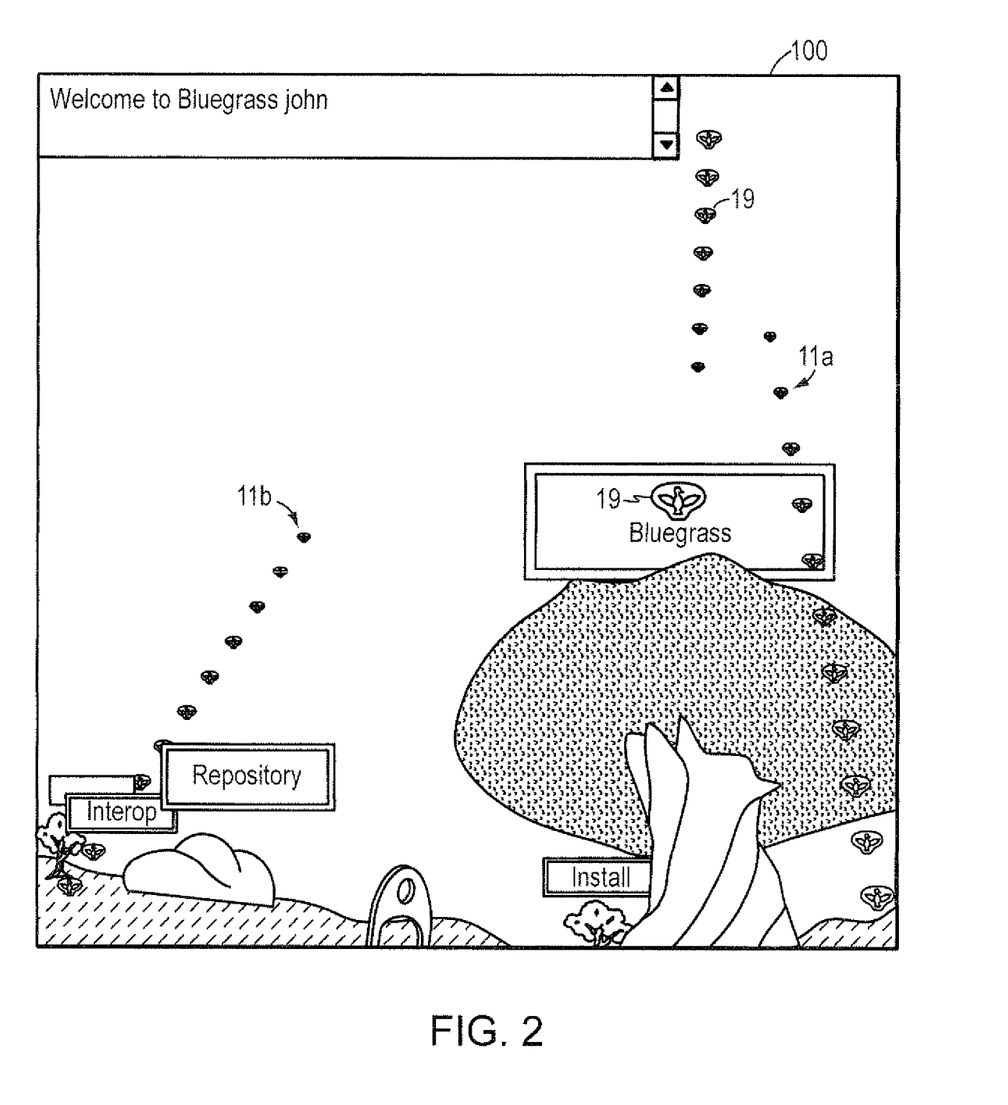
FIG. 2 is a schematic view of aged virtual contact objects of the present invention in the embodiment of FIG. 1.

In FIG. 2 the floating fireflies (virtual contact objects 19) in trails 11 become more faded over time. The higher ones in the screen view 100 are the older ones. Again this provides a visualization or visual cue of presence and length of existence (age) of an end user through his corresponding character/avatar 12, 13. Pseudo code steps 1 and 2a, c, d support this operation.

Each virtual contact object 19 in a trail 11 also effectively serves as a data collection or set of the contact information for the corresponding user contact. Included in the data set are for example, user profile, photograph/image, other multimedia content by the user contact and the like. Known technology and techniques for configuring and forming such virtual contact objects 19 are employed. Similarly user contact data is supported by contact metadata by methods and techniques common in the data management art.

Presence is visualized relative to neighborhood with region indicators "Blue Grass", "Repository", etc. visually loosely defining areas or neighborhoods.

Figure 3:
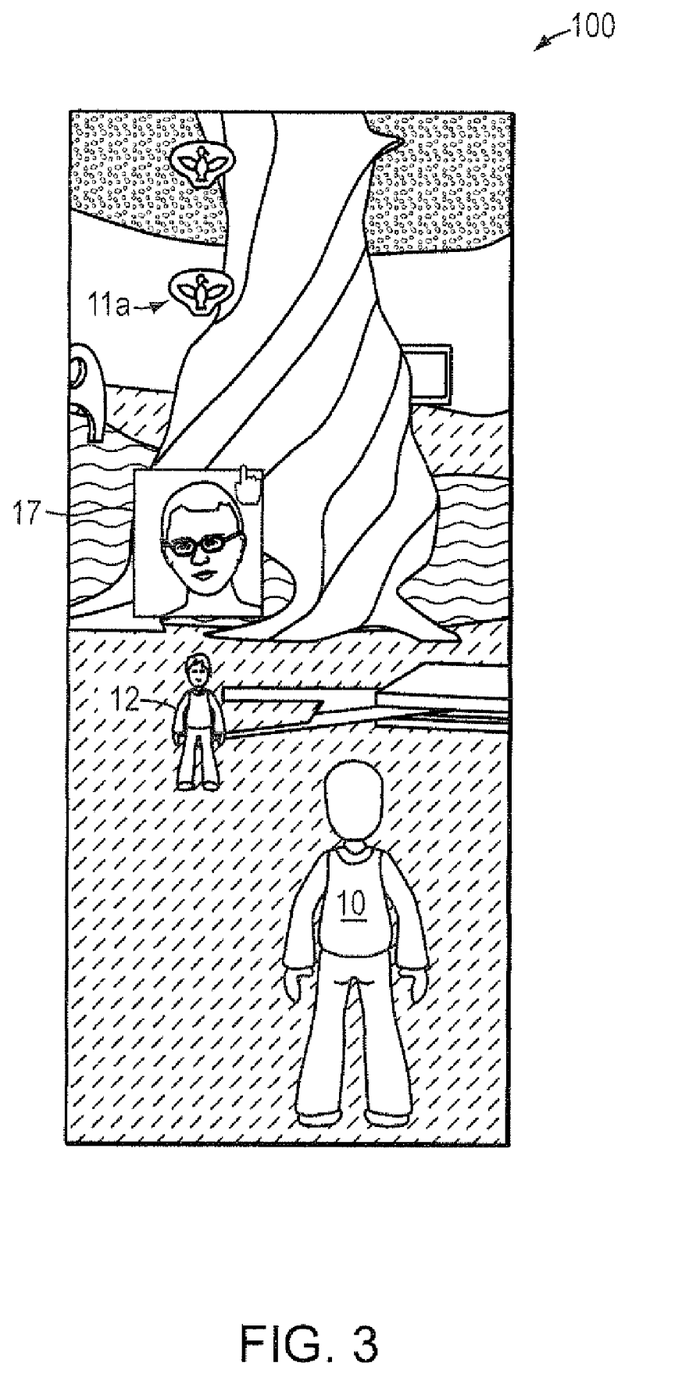
FIG. 3 is a schematic view of a persisted virtual contact object of the present invention in the embodiment of FIG. 1.

As shown in FIG. 3, an end user of 10 clicking on one of the purple fireflies (objects 19) in trail 11 of given avatar 12 turns the selected trail object 19 into a persisted virtual contact object. Pseudo code step 2b supports this. The contact object 19 is now transformed into a photo (photograph or other image) 17 of the corresponding user contact of avatar 12, associated with the subject trail 11. The resulting photo 17 can be moved and manipulated by the end user of 10 as supported by pseudo code step 3. In this way, virtual contact objects 19 provide contact information (in text and image format) and enable interaction between users. The persistence of the selected object 19 enables end user 10 to use the object 19 when the corresponding contact user is off-line.

Figure 4:
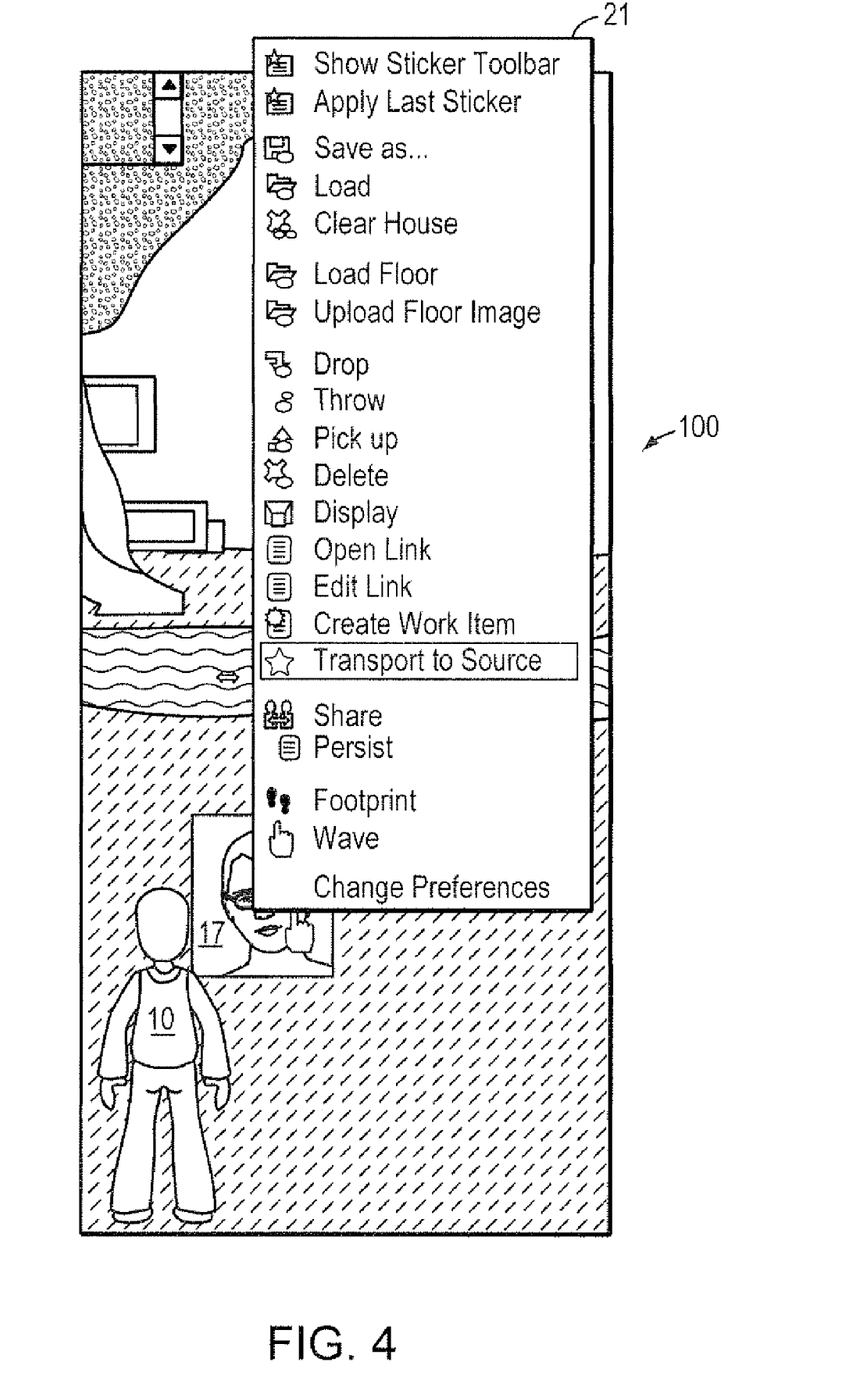
FIG. 4 is a schematic view of an option menu employed with virtual contact objects in the embodiment of FIG. 1.

FIG. 4 shows right-clicking on the virtual contact object 19 provides various options 21, including the ability to teleport the end user character 10 to the contact's current location. And if the contact (represented by avatar 12, 13) is not currently logged on, then the end user character 10 is teleported to the contact's 12, 13 last known location in the virtual world.

Figure 5:
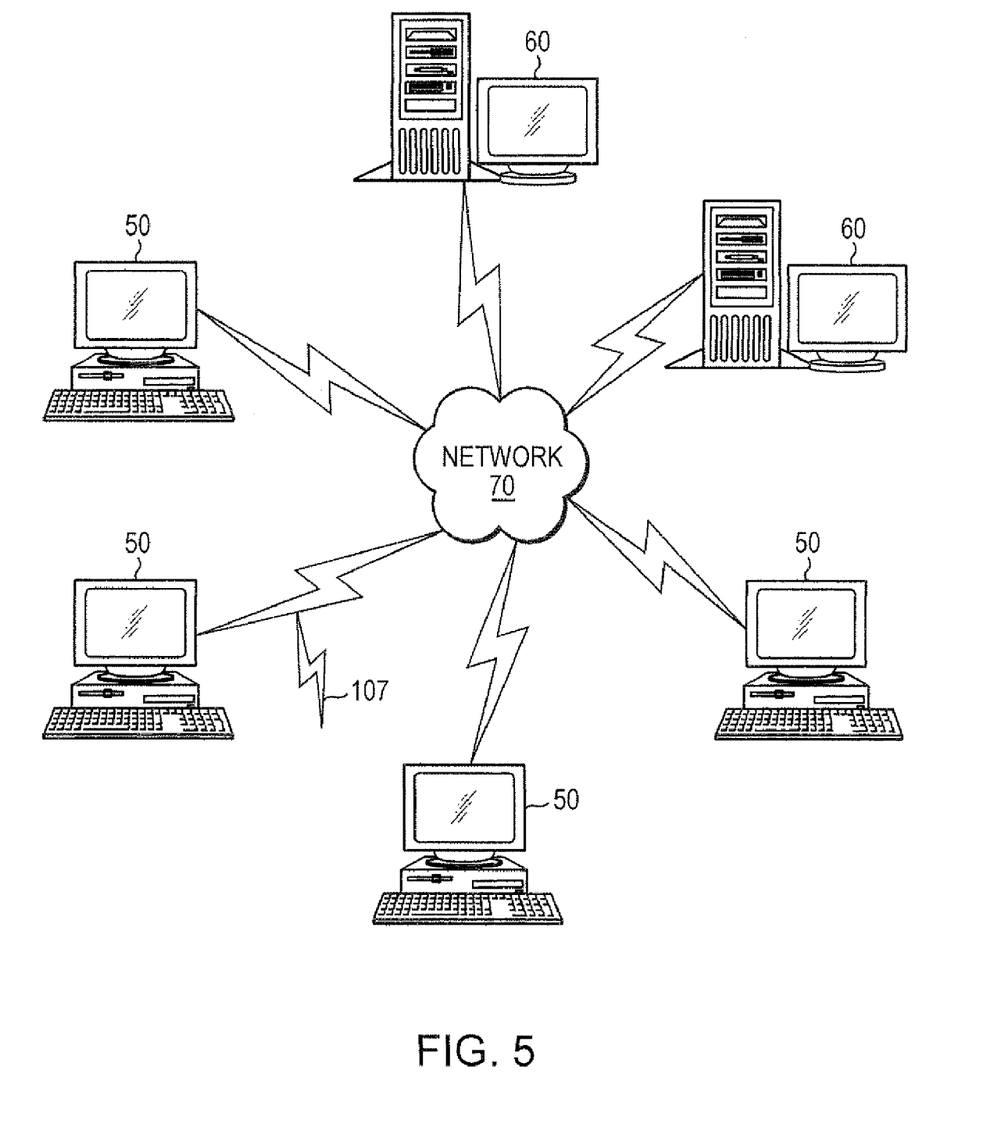
FIG. 5 is a schematic view of a computer network for implementing embodiments of the present invention.

FIG. 5 illustrates a computer network's teleported to or similar digital processing environment in which the present invention may be implemented.

Client computer(s) 50 and server computer(s) 60 provide processing, storage, and input/output devices executing application programs and the like. Client computer(s) 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 6:
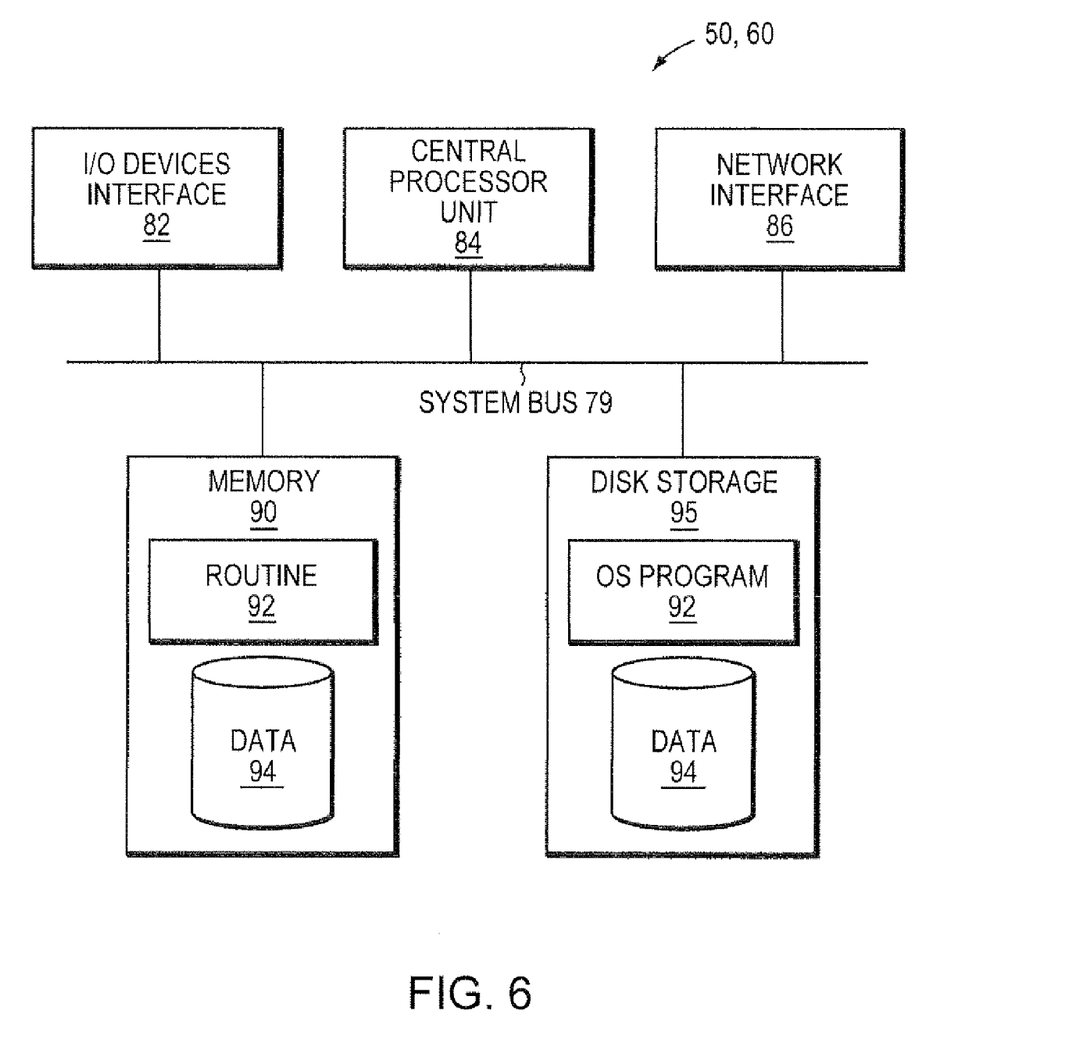
FIG. 6 is a block diagram of a computer node in the network of FIG. 5.

FIG. 6 is a diagram of the internal structure of a computer (e.g., client processor 50 or server computers 60) in the computer system of FIG. 5. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 5). Memory 90 provides volatile storage for computer software instructions 92 and data 94 used to implement an embodiment of the present invention (e.g., virtual contact objects 19, user contact and metadata, trails 11, features such as photo 17 and options 21, and supporting method/operation detailed above and in FIGS. 1 through 4). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/ program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

For example, the present invention may be implemented in a variety of computer architectures. The computer network of FIGS. 4 and 5 are for purposes of illustration and not limitation of the present invention.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable memory storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/ W) and DVD.

What is claimed is:

1. A computer method for providing user contact data in a virtual environment, comprising the steps of:
    through a computer, representing users by respective avatars displayed in a subject computer based virtual environment; and
    for each avatar, automatically computer generating and displaying in proximity to the avatar, a respective trail of virtual contact objects, the automatic generating and displaying being free of user instantiation of the virtual contact objects in the subject virtual environment by the user represented by the avatar, the respective trail of virtual contact objects being associated with the user represented by the avatar and being a visual indication of presence of the user in the subject virtual environment, each virtual contact object in the respective trail storing and providing user contact data of the user being represented by the avatar, the user contact data being different from location data of the avatar and
    wherein each virtual contact object is able to be taken, copied and shared by any other user as representative of user contact information of the user represented by the avatar.

2. A method as claimed in claim 1 wherein each respective trail of virtual contact objects is formed of a time-ordered series of virtual contact objects along a vertically oriented path.

3. A method as claimed in claim 2 further comprising altering appearance of virtual contact objects in the series as a function of any one or combination of time, height, user action and contact metatdata.

4. A method as claimed in claim 1 further comprising the step of:
    upon an end-user performing a certain action on a virtual contact object of a user, persisting the virtual contact object, the user being a contact user;
    wherein the persisted virtual contact object is maintained as a permanent object in the subject virtual environment.

5. A method as claimed in claim 4 wherein the persisted virtual contact object enables the end user to teleport an avatar representing the end user to location of the avatar representing the contact user.

6. A method as claimed in claim 4 wherein the persisted virtual contact object displays a photograph image of the contact user.

7. A method as claimed in claim 4 wherein the persisted virtual contact object changes in appearance as a function of any of time, displayed height, user action and contact metadata.

8. A method as claimed in claim 1 wherein the subject virtual environment is a virtual world for socializing.

9. Computer apparatus providing user contact data in a virtual environment, comprising:
    one or more computer processors;
    a plurality of computer generated avatars representing respective users in a subject virtual environment; and
    for each avatar, a respective automatically computer generated trail of virtual contact objects that are computer executeable and displayed in proximity to the avatar, the respective trail of virtual contact objects being associated with the user represented by the avatar and being a visual indication of presence of the user in the subject virtual environment, each virtual contact object in the respective trail storing and providing user contact data of the user being represented by the avatar, the user contact data being different from location data of the avatar, and each virtual contact object in the respective trail being free of user instantiation in the subject virtual environment by the user being represented by the avatar, wherein each virtual contact object is able to be taken, copied and shared by any other user as representative of user contact information of the user represented by the avatar.

10. Computer apparatus as claimed in claim 9 wherein each respective trail of virtual contact objects is formed of a time-ordered series of virtual contact objects along a vertically oriented path.

11. Computer apparatus as claimed in claim 10 wherein the virtual contact objects in the series alter in appearance as a function of any one or combination of time, height, user action and contact metatdata.

12. Computer apparatus as claimed in claim 9 wherein for each virtual contact object of a user, the virtual contact object is responsive to an end-user performing a certain action on the virtual contact object and persists, the user being a contact user;

wherein the persisted virtual contact object is maintained as a permanent object in the subject virtual environment.

13. Computer apparatus as claimed in claim 12 wherein the persisted virtual contact object enables the end user to teleport an avatar representing the end user to location of the avatar representing the contact user.

14. Computer apparatus as claimed in claim 12 wherein the persisted virtual contact object displays a photograph image of the contact user.

15. Computer apparatus as claimed in claim 12 wherein the persisted virtual contact object changes in appearance as a function of any of time, displayed height, user action and contact metadata.

16. Computer apparatus as claimed in claim 9 wherein the subject virtual environment is a virtual world for socializing.

17. A computer system providing user contact data in a virtual environment, comprising:

in one or more digital processors:

computer means for representing users by respective avatars displayed in a subject computer generated virtual environment; and computer display means, for each avatar, the computer display means rendering display in proximity to the avatar, a respective trail of virtual contact objects, the respective trail of virtual contact objects being automatically computer generated and being associated with the user represented by the avatar in a manner serving as a visual indication of presence, including activeness, of the user in the subject virtual environment, each virtual contact object in the respective trail storing and providing user contact data of the user being represented by the avatar, the user contact data being different from location data of the avatar, and each virtual contact object in the respective trail being free of user instantiation in the subject virtual environment by the user being represented by the avatar, wherein each virtual contact object is able to be taken, copied and shared by any other user as representative of user contact information of the user represented by the avatar.

18. A computer system as claimed in claim 17 wherein each respective trail of virtual contact objects is formed of a time-ordered series of virtual contact objects along a vertically oriented path; and the virtual contact objects in the series alter in appearance as a function of any one or combination of time, height, user action and contact metatdata.

19. A computer system as claimed in claim 17 wherein for each virtual contact object of a user, the virtual contact object is responsive to an end-user performing a certain action on the virtual contact object and persists, the user being a contact user;

wherein the persisted virtual contact object is maintained as a permanent object in the subject virtual environment and is useable by the end user in the subject virtual environment.

20. A computer system as claimed in claim 19 wherein the persisted virtual contact object displays a photo image of the contact user.

21. A computer program product comprising a computer readable memory storage medium having a computer readable program, wherein the computer readable program when executed on a computer causes:

representing users by respective avatars displayed in a subject computer generated virtual environment; and for each avatar, displaying in proximity to the avatar, a respective automatically computer generated trail of virtual contact objects, the respective trail of virtual contact objects being associated with the user represented by the avatar and being a visual indication of presence of the user in the subject virtual environment, each virtual contact object in the respective trail storing and providing user contact data of the user being represented by the avatar, the user contact data being different from location data of the avatar, and each virtual contact object in the respective trail being free of user instantiation in the subject virtual environment by the user being represented by the avatar, wherein each virtual contact object is able to be taken, copied and shared by any other user as representative of user contact information of the user represented by the avatar.

* * * * *